(12) United States Patent
Zitzmann

(10) Patent No.: US 11,585,408 B2
(45) Date of Patent: Feb. 21, 2023

(54) CORD TIGHTENING AND RETAINING DEVICE

(71) Applicant: Sewn Products, LLC, Vesta, MN (US)

(72) Inventor: Sheldon Zitzmann, Redwood Falls, MN (US)

(73) Assignee: SEWN PRODUCTS, LLC, Vesta, MN (US)

( * ) Notice: Subject to any disclaimer, the term of this patent is extended or adjusted under 35 U.S.C. 154(b) by 31 days.

(21) Appl. No.: 17/075,780

(22) Filed: Oct. 21, 2020

(65) Prior Publication Data

US 2021/0123502 A1    Apr. 29, 2021

Related U.S. Application Data

(60) Provisional application No. 62/925,156, filed on Oct. 23, 2019.

(51) Int. Cl.
*F16G 11/10* (2006.01)
*F16G 11/14* (2006.01)

(52) U.S. Cl.
CPC .......... *F16G 11/106* (2013.01); *F16G 11/14* (2013.01)

(58) Field of Classification Search
CPC ............................. F16G 11/106; F16G 11/14
See application file for complete search history.

(56) References Cited

U.S. PATENT DOCUMENTS

| | | | | | |
|---|---|---|---|---|---|
| 1,515,813 | A | * | 11/1924 | Richardson | B65D 63/14 24/134 R |
| 2,740,654 | A | * | 4/1956 | Orschel | G09F 3/0352 292/323 |
| 3,007,220 | A | * | 11/1961 | Hafner | F16G 11/101 403/18 |
| 3,848,959 | A | * | 11/1974 | Parlato | G08B 13/08 439/731 |
| 4,427,253 | A | * | 1/1984 | Smith | H01R 4/2408 439/413 |
| 4,664,463 | A | * | 5/1987 | Carmo | H01R 13/6392 439/369 |
| 4,665,590 | A | * | 5/1987 | Udelhofen | F16G 11/101 24/115 H |
| 4,684,196 | A | * | 8/1987 | Smith | H01R 4/2408 439/411 |
| 4,912,816 | A | * | 4/1990 | Brandt | B63B 21/00 114/230.26 |
| 5,041,012 | A | * | 8/1991 | Caprio | H01R 4/2408 439/413 |
| 5,591,046 | A | * | 1/1997 | Klein | H01R 13/5825 439/467 |

(Continued)

*Primary Examiner* — David M Upchurch
(74) *Attorney, Agent, or Firm* — William H. Honaker; Dickinson Wright PLLC

(57) ABSTRACT

A device for retaining a cord comprises a body having a first surface and a second surface. The second surface is spaced from or disposed at an angle relative to the first surface. The body defines a recess disposed on and extending along the first surface. The body defines a first opening and a second opening. The first opening is disposed adjacent the recess and the second opening is disposed on the second surface. The body defines a bore that extends between the first opening and the second opening to allow the cord to extend through the body. A plurality of teeth extend from opposing walls of the recess for engaging the cord to retain the cord in a taut position.

17 Claims, 5 Drawing Sheets

(56) References Cited

U.S. PATENT DOCUMENTS

| | | | | |
|---|---|---|---|---|
| 6,131,969 | A * | 10/2000 | Natkins | B65D 63/06 |
| | | | | 24/136 R |
| 6,185,798 | B1 * | 2/2001 | Ton | A43C 7/08 |
| | | | | 24/115 G |
| 6,438,802 | B1 * | 8/2002 | Beeman | A01K 27/003 |
| | | | | 24/135 R |
| 6,460,488 | B1 * | 10/2002 | Manzella | A01K 27/003 |
| | | | | 119/712 |
| 6,616,080 | B1 * | 9/2003 | Edwards | A45C 7/0045 |
| | | | | 191/12.2 R |
| 8,535,082 | B2 * | 9/2013 | Lifson | H01R 13/6392 |
| | | | | 439/369 |
| 10,508,713 | B2 * | 12/2019 | Shimizu | F16G 11/044 |
| 10,718,404 | B2 * | 7/2020 | Shimizu | A44B 99/00 |
| 2006/0054070 | A1 * | 3/2006 | Lopes Praca | F16G 11/103 |
| | | | | 114/218 |
| 2010/0081314 | A1 * | 4/2010 | Burr | H01R 13/639 |
| | | | | 439/369 |
| 2015/0343179 | A1 * | 12/2015 | Schumacher | A61M 25/0111 |
| | | | | 604/171 |
| 2016/0310774 | A1 * | 10/2016 | Publicover | A63B 5/11 |
| 2017/0198520 | A1 * | 7/2017 | Anderson | E06B 9/262 |
| 2018/0316137 | A1 * | 11/2018 | Bozikis | H01R 13/639 |

* cited by examiner

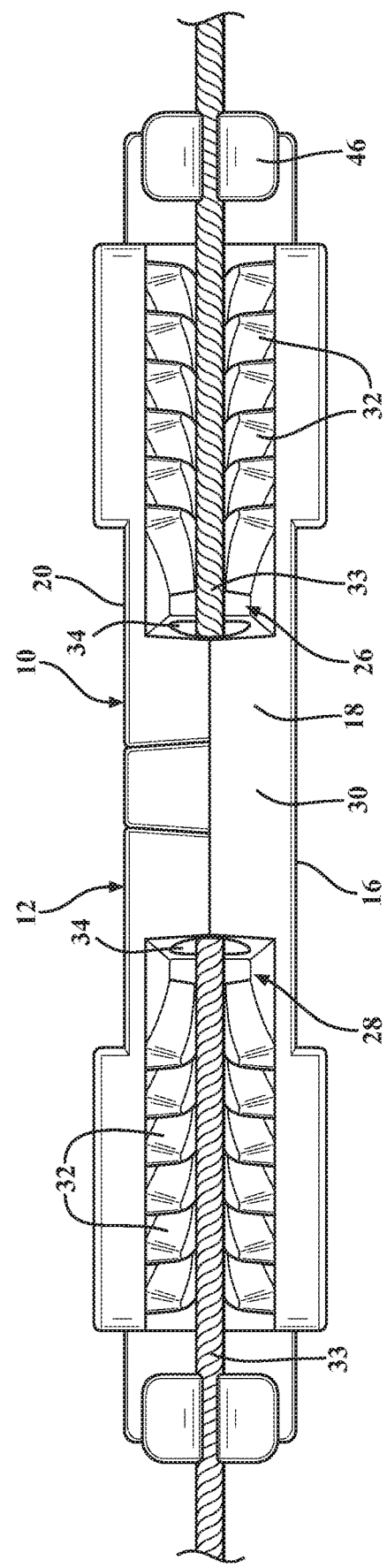

CORD TIGHTENING AND RETAINING DEVICE

CROSS-REFERENCE TO RELATED APPLICATIONS

This application claims the benefit of U.S. Provisional Application Patent Ser. No. 62/925,156, filed on Oct. 23, 2019, the entire disclosure of which is hereby incorporated herein by reference in its entirety.

BACKGROUND OF THE INVENTION

1. Field of the Invention

The present invention generally relates to a cord tightening and retaining device.

2. Description of the Prior Art

Cord tightening devices are generally known in the art for providing connection between ends of two separate cords or opposite ends of a single cord. Typically, due to the arrangement of these devices, it is difficult to secure the cord or cords tightly. As a result, conventional cord tightening devices can be unreliable and users may resort to manually connecting the ends by tying the two ends together. Alternatively, no cord tightening device is provided to secure the ends of the cord or cords due added cost, which produces the same outcome of the user manually tying the ends together. This can be even more difficult when the user has limited access to the space where the ends of the cord, or the two cords, connect, such has the underside of a vehicle seat for securing a seat cover to the vehicle seat.

SUMMARY OF THE INVENTION

The present invention provides a cord tightening and retaining device that allows for allows tight connection easy retainment of two ends of a cord or cords. Further, the present invention provides a cord tightening and retaining device that is low-profile and easy to operate in tight spaces.

It is one aspect of the present invention to provide a device for retaining a cord. The device comprises a body having a first surface and a second surface. The second surface is spaced from or disposed at an angle relative to the first surface. The body defines a recess disposed on and extending along the first surface. The body defines a first opening and a second opening. The first opening is disposed adjacent the recess and the second opening is disposed on the second surface. The body defines a bore that extends between the first opening and the second opening to allow the cord to extend through the body. A plurality of teeth extend from opposing walls of the recess for engaging the cord to retain the cord in a taut position.

It is another aspect of the present invention to provide a device for retaining at least one cord. The device comprises a body having a first surface, a second surface, and a third surface. The second surface and the third surface are spaced from one another and each are spaced from or disposed at an angle relative to the first surface. The body defines a pair of recesses spaced from one another disposed on and extending along the first surface. The body defines a pair of first openings and a pair of second openings. One of the pair of first openings is disposed adjacent one of the pair of recesses. The other of the pair of first openings is disposed adjacent the other of the pair of recesses. One of the pair of second openings is disposed on the second surface and the other of the pair of second openings is disposed on the third surface. The body defines a first bore and a second bore. The first bore extends between one of the pair of first openings and one of the pair of second openings to allow the at least one cord to extend through the body. The second bore extends between the other of the pair of first openings and the other of the pair of second openings to allow the at least one cord to extend through the body. A plurality of teeth extend from opposing walls of each of the pair of recesses for engaging the at least one cord to retain the at least one cord in a taut position.

It is another of the present invention to provide a device for retaining a cord. The device comprises a body having a first surface and a second surface. The second surface is spaced from or disposed at an angle relative to the first surface. The body defines a recess disposed on and extending along the first surface. The body defines a first opening and a second opening. The first opening is disposed adjacent the recess and the second opening is disposed on the second surface. The body defines a bore that extends between the first opening and the second opening to allow the cord to extend through the body. A plurality of teeth extend from opposing walls of the recess for engaging the cord to retain the cord in a taut position. A pair of fingers is disposed adjacent the recess for receiving the cord. The pair of fingers engage one another to define a closed position and are moveable away from one another to define an open position. The pair of fingers are biased in the closed position for securing the cord to the device in the taut position.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 5 is a perspective view of the cord tightening and retaining device of the present invention with a cord tightened and retained in use on a seat cover for a vehicle seat.

DETAILED DESCRIPTION OF A PREFERRED EMBODIMENT

Figure 1:
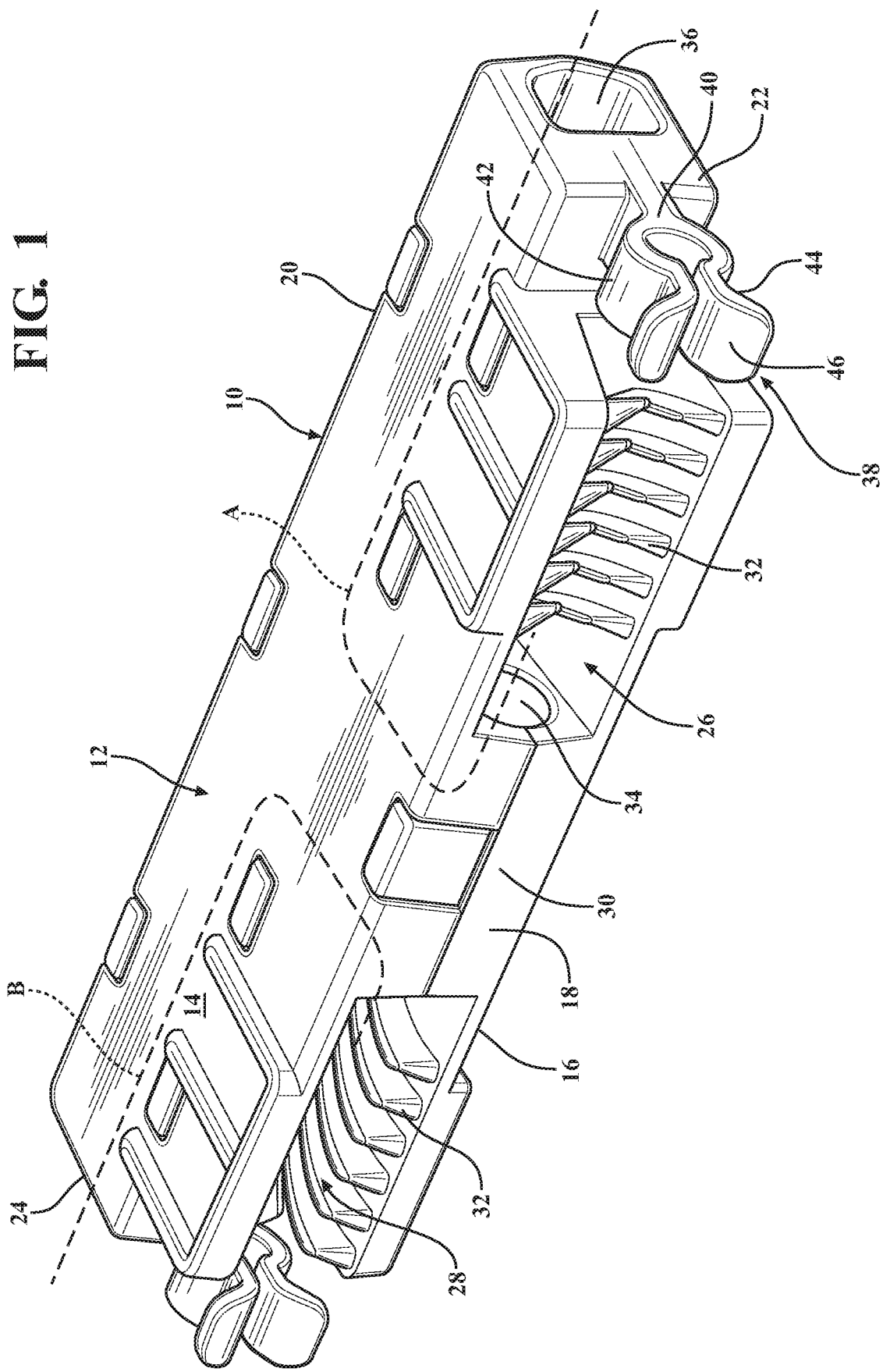
FIG. 1 is a perspective view of the cord tightening and retaining device of the present invention.
Figure 2:
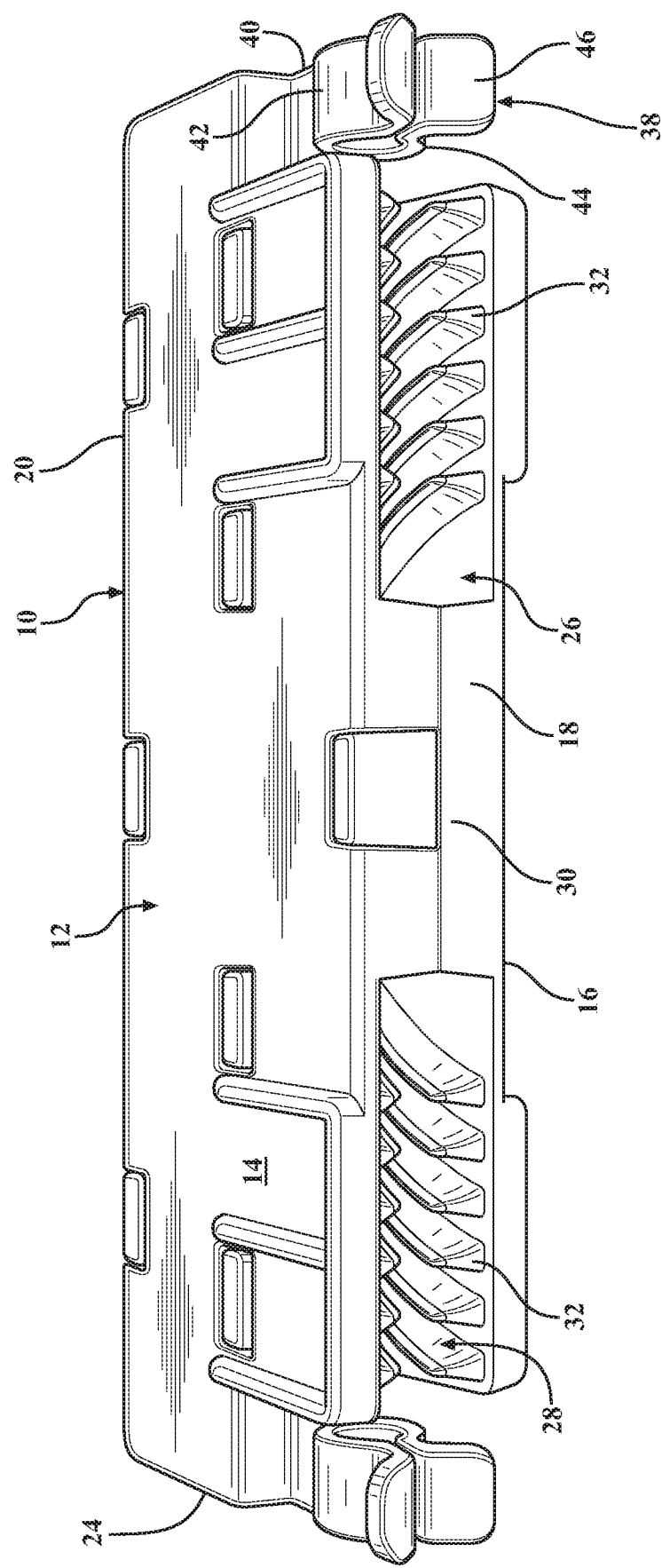
FIG. 2 is a perspective view of the cord tightening and retaining device of the present invention.
Figure 3:
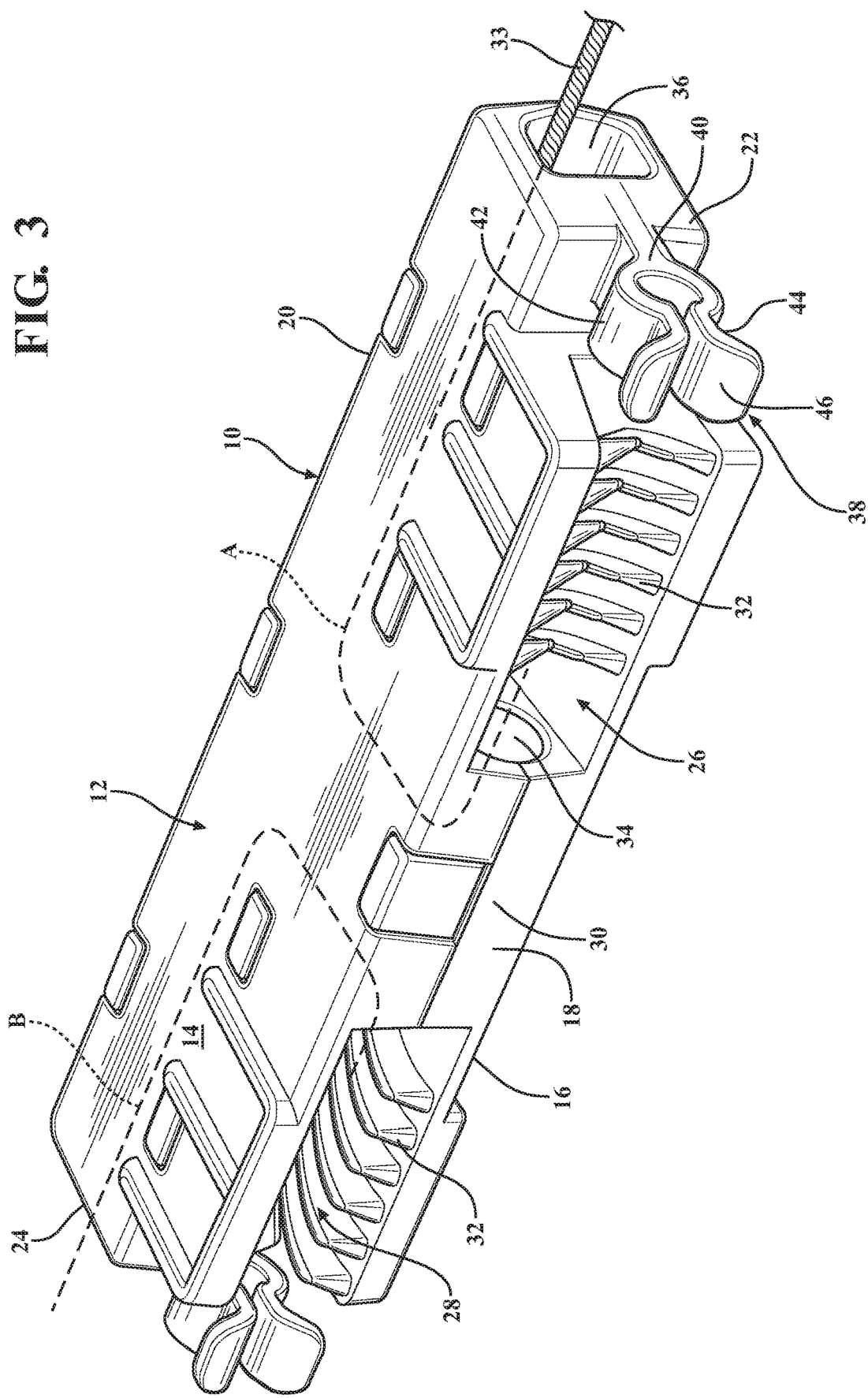
FIG. 3 is a perspective view of the cord tightening and retaining device of the present invention with a cord positioned in the device.
Figure 4:
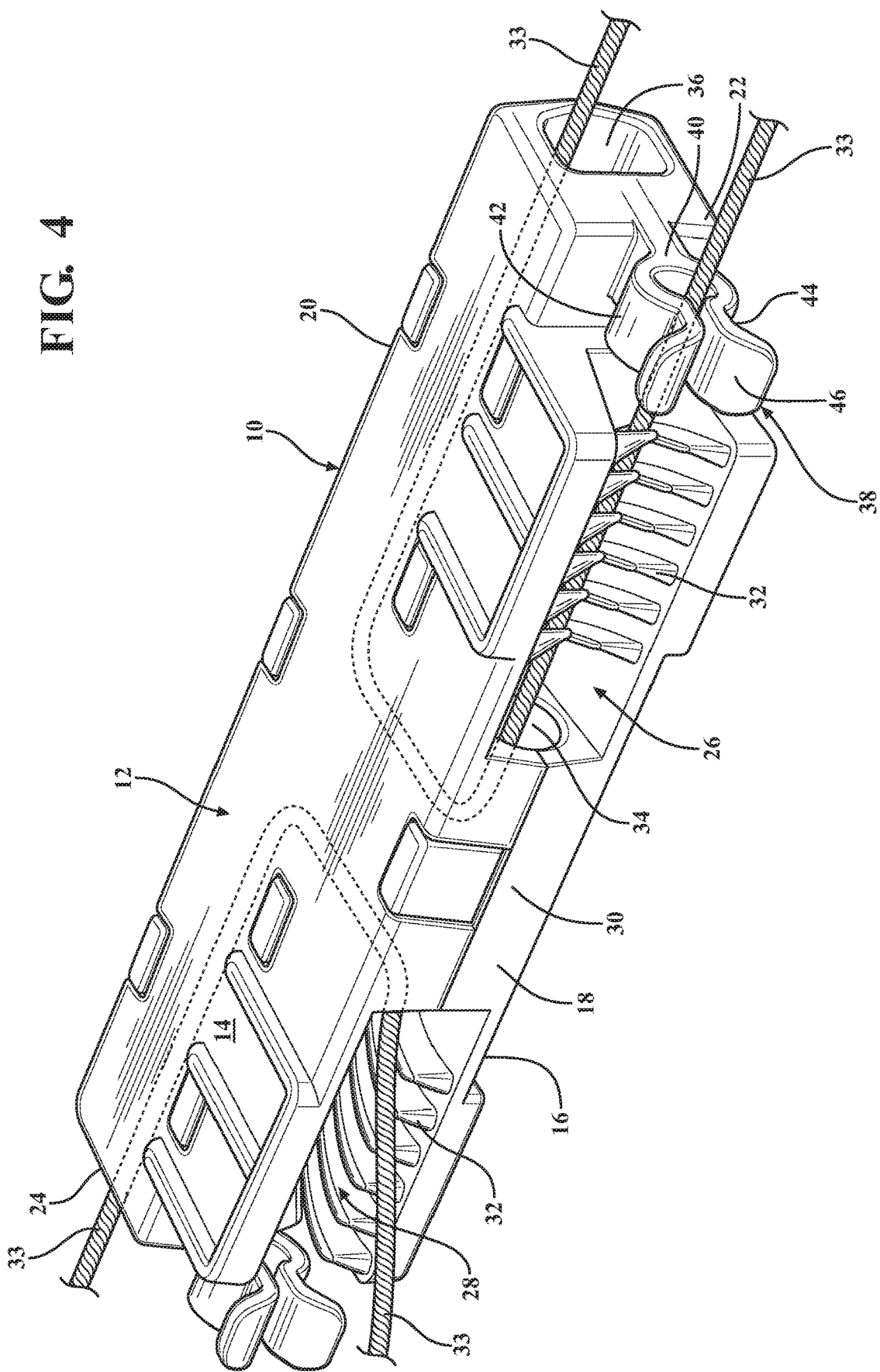
FIG. 4 is a perspective view of the cord tightening and retaining device of the present invention with a cord tightened and retained.

Referring to the Figures, wherein like numerals indicate corresponding parts throughout the several views, a cord tightening and retaining device 10 constructed in accordance with one embodiment of the present invention is generally shown in FIG. 1. The device 10 includes a body 12, which is illustrated as being generally rectangular. It should be understood that other shapes could be used, such as for example square, oval, triangular etc. The use of the term cord is meant to be very general and to include for example, string, wire, rope, cables, etc., and all would be of various lengths and diameters. In addition, the term cord includes at least one cord, a single cord, or several cords.

The body 12 has a top surface 14 a bottom surface 16. The body includes a first surface 18 and at least one second surface 20, 22, and 24. In some embodiments, the first surface 18 and the at least one second surface 20, 22, and 24 are side surfaces 18, 20, and 22, with the side surfaces 20, 22, and 24 being spaced from or disposed at an angle relative to the first surface 18. In particular, the at least one second surface may include a third surface 24 extending at an oblique angle from the first surface 18 and being spaced from and parallel to the second surface 22. The body 12 defines a pair of recesses 26, 28 spaced from one another by a central section 30, disposed on and extending along the first surface 18. A plurality of teeth 32 extend from opposing walls of each of the pair of recesses 26, 28 for engaging at least one cord 33 to retain the cord 33 in a taut position. In one embodiment, the free ends of the teeth 32 are closely adjacent to one another and narrow from the first surface 18 toward the side surface 20. It should be appreciated that the device 10 may be a pair of cord retaining devices 10 divided between the central section 30 and the side surface 20 to form two separated cord retaining devices or to form a unitary device 10 as illustrated in the figures.

The body defines a pair of first openings 34 and a pair of second openings 36. One of the pair of first openings 34 is disposed adjacent one of the pair of recesses 26. The other of the pair of first openings 34 is disposed adjacent the other of the pair of recesses 38. One of the pair of second openings 36 is disposed on the second surface 22 (i.e. side surface 22) and the other of the pair of second openings 36 is disposed on the third surface 24 (i.e. side surface 24).

The body 12 defines a first bore and a second bore that extend through the body 12 and exit in the first openings 34 in the central section 30 adjacent the pair of recesses 26 and 28. In other words, the first bore extends between one of the pair of first openings 34 and one of the pair of second openings 36 to allow a part of the at least one cord 33 to extend through the body 12. The second bore extends between the other of the pair of first openings 34 and the other of the pair of second openings 36 to allow another part of the at least one cord 33 to extend through the body 12. The first bore and the second bore are each arcuate in shape between the corresponding openings 34, 36 and illustrated at curves A and B, respectively. In particular, the first bore and the second bore are generally J shaped between the corresponding openings 34, 36, with the J shape of the first bore being mirrored with the J shape of the second bore about a central axis between the central section 30 and the side surface 20. It should be understood by those of ordinary skill in the art that each bore could be L-shaped, U-shaped etc., or the first bore may have a different shape than the second shape.

One of the pair of recesses 26 and one of the pair of second openings 36 extend parallel to one another to form a generally U shaped pathway for a first portion the at least one cord 33 in the taut position. The other of the pair of recesses 28 and the other of the pair of second openings 36 extends parallel to one another to form a generally U shaped pathway for a second portion of the at least one cord 33 in the taut position. The first portion of the at least one cord 33 and the second portion of the at least one cord 33 extend parallel to one another at the pair of second openings 36 and the pair of recesses 26, 28 in the taut position. The first portion may be a portion of a first cord 33 and the second portion may be a portion of a second cord 33.

Retaining clips 38 for receiving the at least one cord 33 are positioned adjacent each of the pair of recesses 26 and 28. The retaining clips 38 are defined by a pair of fingers 40.

Each finger 40 has a generally sinusoidal shape with a concave section 42 ending in a convex section 44. The convex section 44 ends in upturned receiving lips 46. The fingers 40 are flexible and allow a cord 33 to be snapped between the fingers 40 and held in place. In other words, the pair of fingers 40 engage one another to define a closed position and are moveable away from one another to define an open position. The pair of fingers 40 are biased in the closed position for securing the at least one cord 33 to the device 10 in the taut position.

The device 10 in the disclosed embodiment is made of molded plastic. In one embodiment, device 10 is molded in two halves that are snapped together to form the device 10. It should be appreciated that, in some embodiments, the device 10 may be formed of any sturdy material, such as metal, wood, etc.

In use, a cord 33 is threaded into one of the pair of second openings 36 in side surface 22, through the bore and out one of the pair of first openings 34. The cord 33 is then pulled through the teeth 32 in the direction parallel to the remaining cord 33 that was inserted into opening 36. The teeth 32 grip the cord 33 and retain it as it is pulled. Another cord 33 or the other end of the same cord 33 is threaded into the other of the pair of second openings 34 in side surface 24 and pulled through the teeth 32. The free ends of the cords 33 can be pulled in opposite directions to tighten them as desired. Once tightened, the cords 33 are further retained by snapping them between the respective retaining clips 38.

The device 10 of the present invention is shown in use in FIG. 5. The device 10 may be installed under the seat of a vehicle to mount a seat cover over the seat. The seat cover is normally installed by manually tying together the free ends of two cords 33 attached to the seat cover. The cords 33 have to be tightly pulled together, held and then knotted to each other. This is a difficult operation considering the location being under the seat and the various sharp objects adjacent the free ends of the cords 33. With the device 10 of the present invention the free ends are inserted into the pair of second openings 36 and routed through the pair of first openings 34. The free ends are then drawn through the recesses 26 and 28 and held by the teeth 32. The cord 33 can be pulled tightly and held by the teeth 32. Once fully tightened, the free ends can by snapped into the retaining clips 38.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A device for retaining a cord, said device comprising:
   a body having an exterior surface and interior surface and a first surface and a second surface, said second surface spaced from or disposed at an angle relative to said first surface;

said body defining a recess extending from said exterior surface into said interior surface and disposed on and extending along said first surface;

said body defining a first opening and a second opening, wherein said first opening is disposed adjacent said recess and said second opening is disposed on said second surface extending into said interior surface from said exterior surface;

said body defining a continuous bore extending within said interior surface between said first opening and said second opening to allow a cord to extend through said body; and a plurality of teeth extending within said recess for engaging the cord to retain the cord in a taut position.

2. The device as set forth in claim 1, wherein said second surface extends at an oblique angle from said first surface and wherein said recess extends toward said second surface.

3. The device as set forth in claim 1, wherein said bore is arcuate in shape between said first opening and said second opening.

4. The device as set forth in claim 1, wherein said bore is J shaped between said first opening and said second opening.

5. The device as set forth in claim 1, wherein said recess and said second opening extend parallel to one another to form a generally U shaped pathway for said cord in said taut position.

6. The device as set forth in claim 1 further including a pair of fingers disposed adjacent said recess for receiving the cord, wherein said pair of fingers engage one another to define a closed position and are moveable away from one another to define an open position; and whereby said pair of fingers are biased in said closed position for securing the cord to said device in the taut position.

7. A device for retaining at least one cord, said device comprising:

a body having an exterior surface and interior surface partially defined by a first surface, a second surface, and a third surface, with said second surface and said third surface being spaced from one another and each being spaced from or disposed at an angle relative to said first surface;

said body defining a pair of recesses spaced from one another disposed on and extending along said first surface and extending from said exterior surface into said interior surface;

said body defining a pair of first openings extending into said interior surface and a pair of second openings, wherein one of said pair of first openings is disposed adjacent one of said pair of recesses and communicates with said recess, and the other of said pair of first openings is disposed adjacent the other of said pair of recesses and communicates with said other of said pair of recesses;

wherein one of said pair of second openings is disposed on said second surface and the other of said pair of second openings is disposed on said third surface;

said body defining a first bore and a second bore, with said first bore extending between one of said pair of first openings and one of said pair of second openings to allow a cord to extend through said interior surface of said body, and with said second bore extending between the other of said pair of first openings and the other of said pair of second openings to allow a cord to extend through said interior surface of said body; and a plurality of teeth extending within each of said pair of recesses for engaging a cord to retain the cord in a taut position.

8. The device as set forth in claim 7, wherein said second surface extends at an oblique angle from said first surface and wherein one of said pair of recesses extends toward said second surface.

9. The device as set forth in claim 8, wherein said third surface extends at an oblique angle from said first surface and wherein the other of said pair of recesses extends toward said third surface.

10. The device as set forth in claim 7, wherein said first bore has an arcuate shape and said second bore has an arcuate shape.

11. The device as set forth in claim 7, wherein said first bore and said second bore are each J shaped.

12. The device as set forth in claim 7, further including at least one cord having a first portion and a second portion, wherein said bore between one of said pair of recesses and one of said pair of second openings forms a generally U shaped pathway for a first portion of said at least one cord in the taut position, and wherein the other bore between the other of said pair of recesses and the other of said pair of second openings extends to form a generally U shaped pathway for a second portion of said at least one cord in the taut position.

13. The device as set forth in claim 12, wherein said first portion of said at least one cord and said second portion of said at least one cord extend parallel to one another at one of said pair of second openings and one of said corresponding pair of recesses in said taut position.

14. The device as set forth in claim 12, wherein said at least one cord is a first cord and a second cord, with said first portion being a portion of said first cord and said second portion being a portion of said second cord.

15. The device as set forth in claim 7, wherein said at least one cord is only one cord.

16. The device as set forth in claim 7 further including a pair of fingers disposed adjacent each of said pair of recesses for receiving said at least one cord wherein said pair of fingers engage one another to define a closed position and are moveable away from one another to define an open position; and whereby said pair of fingers are biased in said closed position for securing the at least one cord in the taut position.

17. The device as set forth in claim 7, wherein said second surface and said third surface are spaced from one another and extend parallel to one another from said first surface.

* * * * *